US008520851B2

(12) United States Patent
Brown et al.

(10) Patent No.: US 8,520,851 B2
(45) Date of Patent: Aug. 27, 2013

(54) WIRELESS COMMUNICATION DEVICE WITH SECURELY ADDED RANDOMNESS AND RELATED METHOD

(75) Inventors: Michael K. Brown, Ontario (CA); Michael S. Brown, Ontario (CA); Herbert A. Little, Ontario (CA)

(73) Assignee: BlackBerry Limited, Waterloo (CA)

( * ) Notice: Subject to any disclaimer, the term of this patent is extended or adjusted under 35 U.S.C. 154(b) by 2133 days.

(21) Appl. No.: 10/835,276

(22) Filed: Apr. 30, 2004

(65) Prior Publication Data

US 2005/0245231 A1    Nov. 3, 2005

(51) Int. Cl.
*H04K 1/00*        (2006.01)

(52) U.S. Cl.
USPC ........................................................ 380/270

(58) Field of Classification Search
USPC ................................................. 380/370, 270
See application file for complete search history.

(56) References Cited

U.S. PATENT DOCUMENTS

| | | | | |
|---|---|---|---|---|
| 4,797,672 A * | 1/1989 | Kousa | ........................... | 340/5.26 |
| 5,005,183 A * | 4/1991 | Carey et al. | ..................... | 375/130 |
| 5,623,548 A * | 4/1997 | Akiyama et al. | ................ | 380/28 |
| 5,680,131 A * | 10/1997 | Utz | ............................... | 341/176 |
| 5,794,139 A | 8/1998 | Mizikovsky et al. | | |
| 6,097,307 A * | 8/2000 | Utz | ................................. | 340/5.8 |
| 6,108,424 A * | 8/2000 | Pitiot | ............................. | 380/270 |
| 6,128,390 A * | 10/2000 | Kimura et al. | ................. | 380/268 |
| 6,167,389 A * | 12/2000 | Davis et al. | .................... | 705/412 |
| 6,253,223 B1 * | 6/2001 | Sprunk | .......................... | 708/250 |
| 6,275,586 B1 * | 8/2001 | Kelly | ............................... | 380/46 |
| 6,359,983 B1 * | 3/2002 | Krone et al. | ............. | 379/399.01 |
| 6,430,170 B1 * | 8/2002 | Saints et al. | ................... | 370/335 |
| 6,581,044 B1 * | 6/2003 | Alur | ................................. | 705/59 |
| 6,687,721 B1 * | 2/2004 | Wells et al. | .................... | 708/250 |
| 6,934,388 B1 * | 8/2005 | Clark | ............................... | 380/47 |
| 6,937,728 B1 * | 8/2005 | Abe et al. | ....................... | 380/237 |
| 6,981,137 B2 * | 12/2005 | Deo et al. | ....................... | 713/151 |
| 6,993,542 B1 * | 1/2006 | Meiyappan | ................... | 708/250 |
| 7,023,356 B2 * | 4/2006 | Burkhardt et al. | ........ | 340/825.49 |
| 7,028,059 B2 * | 4/2006 | Williams | ....................... | 708/250 |
| 2002/0053025 A1 * | 5/2002 | Deo et al. | ....................... | 713/170 |
| 2002/0154776 A1 * | 10/2002 | Sowa et al. | ..................... | 380/247 |
| 2002/0164020 A1 * | 11/2002 | Mustafa | .......................... | 380/46 |
| 2002/0164026 A1 * | 11/2002 | Huima | ........................... | 380/247 |
| 2003/0063742 A1 * | 4/2003 | Neufeld et al. | .................. | 380/46 |
| 2003/0128843 A1 * | 7/2003 | Brown et al. | .................... | 380/46 |
| 2003/0147534 A1 * | 8/2003 | Ablay et al. | .................. | 380/270 |

(Continued)

FOREIGN PATENT DOCUMENTS

WO    WO 01/93528 A2    12/2001

OTHER PUBLICATIONS

Deley W. D., Computer Generated Random Numbers, 1991.*
European Search Report.

*Primary Examiner* — Techane Gergiso
(74) *Attorney, Agent, or Firm* — Ridout & Maybee LLP (57) ABSTRACT

A wireless communication system which employs cryptographic functions requiring random data input in a mobile wireless device includes provisions for securely adding randomness to the mobile wireless device. Such added randomness can be securely provided during synchronizing sessions with a device user's base computer via secure wired and/or wireless connections. The new random data can be obtained by software and/or hardware random number generators accessible to the user's base computer and/or from accessible secure external sources (e.g., a secure website source of random data).

27 Claims, 5 Drawing Sheets

(56) References Cited

U.S. PATENT DOCUMENTS

| | | | |
|---|---|---|---|
| 2003/0196084 A1* | 10/2003 | Okereke et al. | 713/156 |
| 2004/0101142 A1* | 5/2004 | Nasypny | 380/278 |
| 2004/0172531 A1* | 9/2004 | Little et al. | 713/155 |
| 2005/0175180 A1* | 8/2005 | Venkatesan et al. | 380/268 |
| 2005/0256863 A1* | 11/2005 | Crivella et al. | 707/4 |
| 2006/0143453 A1* | 6/2006 | Imamoto et al. | 713/169 |
| 2006/0153380 A1* | 7/2006 | Gertner | 380/221 |
| 2006/0280306 A1* | 12/2006 | Younis | 380/270 |

* cited by examiner

WIRELESS COMMUNICATION DEVICE WITH SECURELY ADDED RANDOMNESS AND RELATED METHOD

BACKGROUND OF THE INVENTION

1. Field of the Invention

This invention generally relates to wireless communication systems including a wireless communication device having cryptographic functions requiring random data inputs (e.g., to generate cryptographic keys, certificates and the like).

2. Related Art

Well known cryptographic processes (e.g., for generating cryptographic keys, certificates and the like) often require a random data input from time to time. There are many known forms of software and hardware random number generators that may be used and many of them depend upon input of a random "seed" data.

Initializing random seed data may be supplied during manufacture or may be provided subsequently by a desired known technique. However, for various reasons, it is possible that the randomness of data in the random seed may be less than desirable. For example, when a mobile wireless communication device is provisioned for the first time at the factory, it may leave the factory with a random seed that is not entirely random with respect to other devices manufactured and provisioned at approximately the same time. Furthermore, for various reasons it is sometimes necessary (or at least desirable) to "wipe" all stored data (including the stored random seed data) from the device memory. This may happen, for example, when updating software, recovering from abnormal conditions—or merely for enhanced security purposes subsequent to some period of uncontrolled access to the device. For example, it is conceivable that if an unauthorized entity gains access to the device, then information might be ascertainable that relates to the content of a stored random seed and thus possibly make future cryptographic communication sessions vulnerable to unauthorized decryption. In other words, the device may pass out of possession of the authorized user (either intentionally or unintentionally) and thus become an untrusted device—unless suitable randomness can be restored to the random seed data stored in the device.

Accordingly, there is a needed ability to securely add randomness to a wireless communication device within a wireless communication system.

BRIEF SUMMARY OF THE INVENTION

For reasons such as those noted above, we have recognized that it would be advantageous to permit new randomness to be securely added to a wireless communication device within a wireless communication system.

The exemplary embodiment of this invention permits added randomness to be securely transferred to a wireless communication device during secure data synchronization sessions with a user's base unit (e.g., a personal desktop computer).

In the exemplary embodiment, a user's mobile wireless device and base unit may be connected as usual by a trusted and secure wired connection (e.g., a serial I/O port connection between these units). If a secure over the air (OTA) data synchronization session is available, then such new random data may also be transferred via the secure OTA link (either from the user's base unit or from other available sources, if any).

In the exemplary embodiment, a random pool database is created and maintained in a device memory. The device is also provided with a secure data input/output port (e.g., a serial wired I/O port for wired connection to the user's base unit). The exemplary device also includes a control processor configured to store new or added random data in that random pool database memory based on new random data securely received via the secure I/O port. New random data may entirely replace the old random pool data or the new random pool data may result from a combination or permutation of received new random data.

In the exemplary embodiment, the user's base unit may be configured to provide such new random data to the wireless communication device via an inter-connected secure input/output data port (e.g., a wired serial I/O port). The base unit may generate the new random data from an accessible software random number generator, hardware random number generator or external securely maintained and accessible website offering random number data. In fact, the new random data may be obtained from any one or all of such sources that might be accessible at a given time. The resulting new random data may be selected from one of such sources or may represent a combination or permutation from plural such sources.

This invention may be embodied in hardware, software or a combination of hardware and software. The invention also provides a method for securely adding randomness to a wireless communication device in a wireless communication system. The exemplary embodiment is realized, at least in part, by executable computer program code which may be embodied in physical program memory media.

BRIEF DESCRIPTION OF THE DRAWINGS

These and other objects and advantages of this invention will be better understood and appreciated in conjunction with the following detailed description of exemplary embodiments taken together with the accompanying drawings, of which.

DETAILED DESCRIPTION OF THE INVENTION

Figure 1:
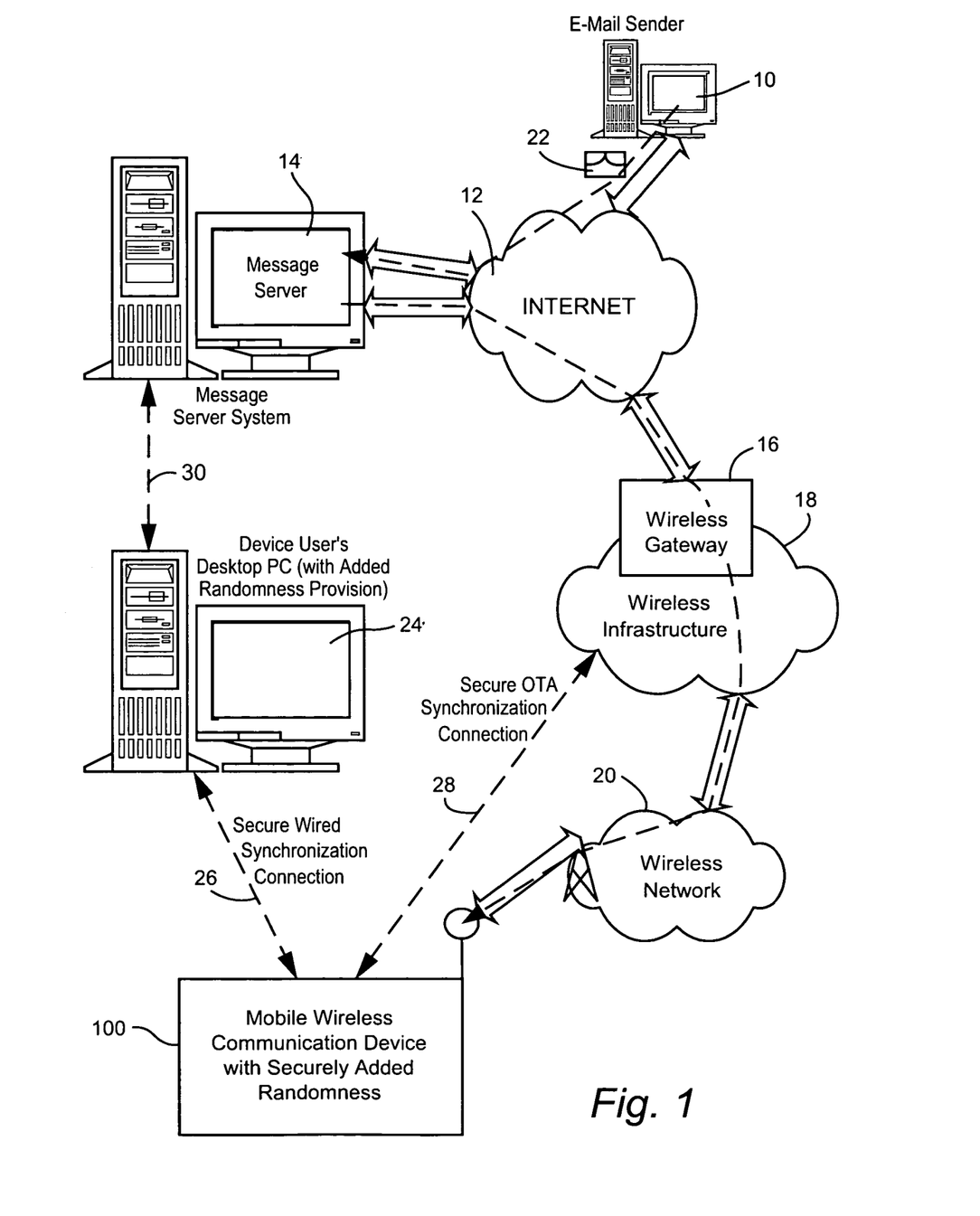
FIG. 1 is an overall system wide schematic view of an exemplary wireless communication system incorporating a mobile wireless communication device with securely added randomness in accordance with one exemplary embodiment of this invention.

FIG. 1 is an overview of an exemplary communication system in which a wireless communication device 100 may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet e-mail environment.

FIG. 1 shows an e-mail sender 10, the Internet 12, a message server system 14, a wireless gateway 16, wireless infrastructure 18, a wireless network 20 and a mobile communication device 100.

An e-mail sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as America Online™ (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for e-mail exchange over the Internet 12. Although other messaging systems might not require a message server system 14, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the invention described below. Message servers such as server 14 typically extend beyond just e-mail sending and receiving; they also include dynamic database storage engines that have predefined database formats for data like calendars, to-do lists, task lists, e-mail and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to the mobile device 100 via wireless transmission, typically at a radio frequency (RF), from a base station in the wireless network 20 to the mobile device 100. The particular network 20 may be virtually any wireless network over which messages may be exchanged with a mobile communication device.

As shown in FIG. 1, a composed e-mail message 22 is sent by the e-mail sender 10, located somewhere on the Internet 12. This message 22 typically uses traditional Simple Mail Transfer Protocol (SMTP), RFC 822 headers and Multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment, messages addressed to a message server account associated with a host system such as a home computer or office computer base unit 24 which belongs to the user of a mobile device 100 are redirected from the message server 14 to the mobile device 100 as they are received. As will be explained below, the user's base system (e.g., a desktop PC) includes added randomness provisions (i.e., stored program logic) in the exemplary embodiment.

Regardless of the specific mechanism controlling forwarding of messages to mobile device 100, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the Data TAC™ Radio Network. Examples of older voice-centric data networks include Personal Communication Systems (PCS) networks like GSM, and TDMA systems.

Figure 2:
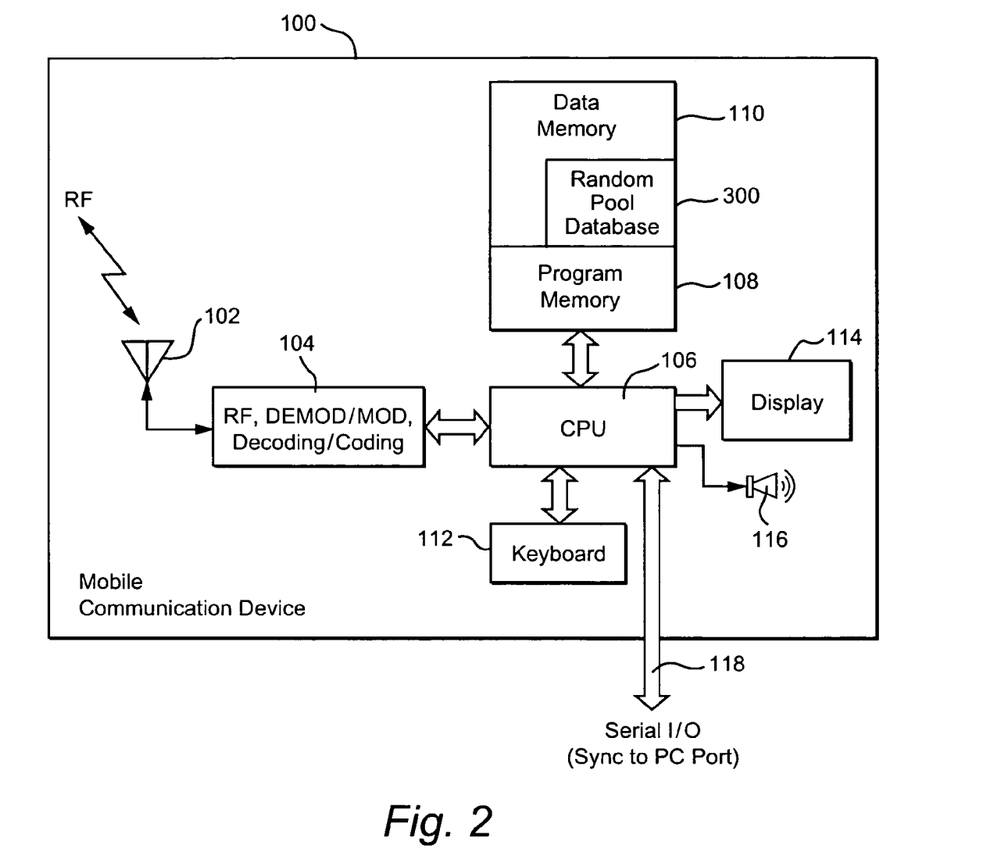
FIG. 2 is an abbreviated schematic diagram of hardware included within an exemplary mobile wireless communication device.

As depicted in FIG. 2, mobile communication device 100 includes a suitable RF antenna 102 for wireless communication to/from wireless network 20. Conventional RF, demodulation/modulation and decoding/coding circuits 104 are provided. As those in the art will appreciate, such circuits can involve possibly many digital signal processors (DSPs), microprocessors, filters, analog and digital circuits and the like. However, since such circuitry is well known in the art, it is not further described.

The mobile communication device 100 will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of data memory 300 is available for storing a random pool of data. Suitable computer program executable code is stored in portions of program memory 108 to constitute stored program logic for receiving and using new, added, randomness as described below (e.g., via a wired serial I/O port 118 or the wireless RF antenna 102).

As depicted in FIG. 1, a secure wired synchronization connection 26 (e.g., between serial I/O ports of the user's base unit 24 and the wireless device 100) is typically provided for normal data synchronization purposes (e.g., to synchronize databases in the two devices with respect to such things as calendars, to-do lists, task lists, address books, etc.). Part of prior data synchronization processes has included a program logic such as Cert Sync for maintaining synchronization between cryptographic message certificates. If a secure over the air (OTA) synchronization connection 28 is available, it may also be used by Cert Sync to maintain synchronization of cryptographic message certificates.

As previously described, there is a communication link (e.g., depicted in dotted lines at 30 in FIG. 1) typically found between the device user's base unit 24 and a system message server 14. Accordingly, there is an existing communication path that may be utilized for passing synchronization data from the user's base unit 24 via channel 30, the server 14, Internet 12, wireless gateway 16 and wireless infrastructure 18 via the over the air (OTA) synchronization connection 28.

The mobile wireless communication device 100 may have less than desired randomness after being provisioned for the first time (e.g., in a manufacturing process where many similar devices are being created and provisioned or after the device memory has been "wiped" either unintentionally or for some intentional reason). However, a lot of security on the device 100 depends on randomness (e.g., to create cryptographic keys, cryptographic certificates and the like).

Figure 3:
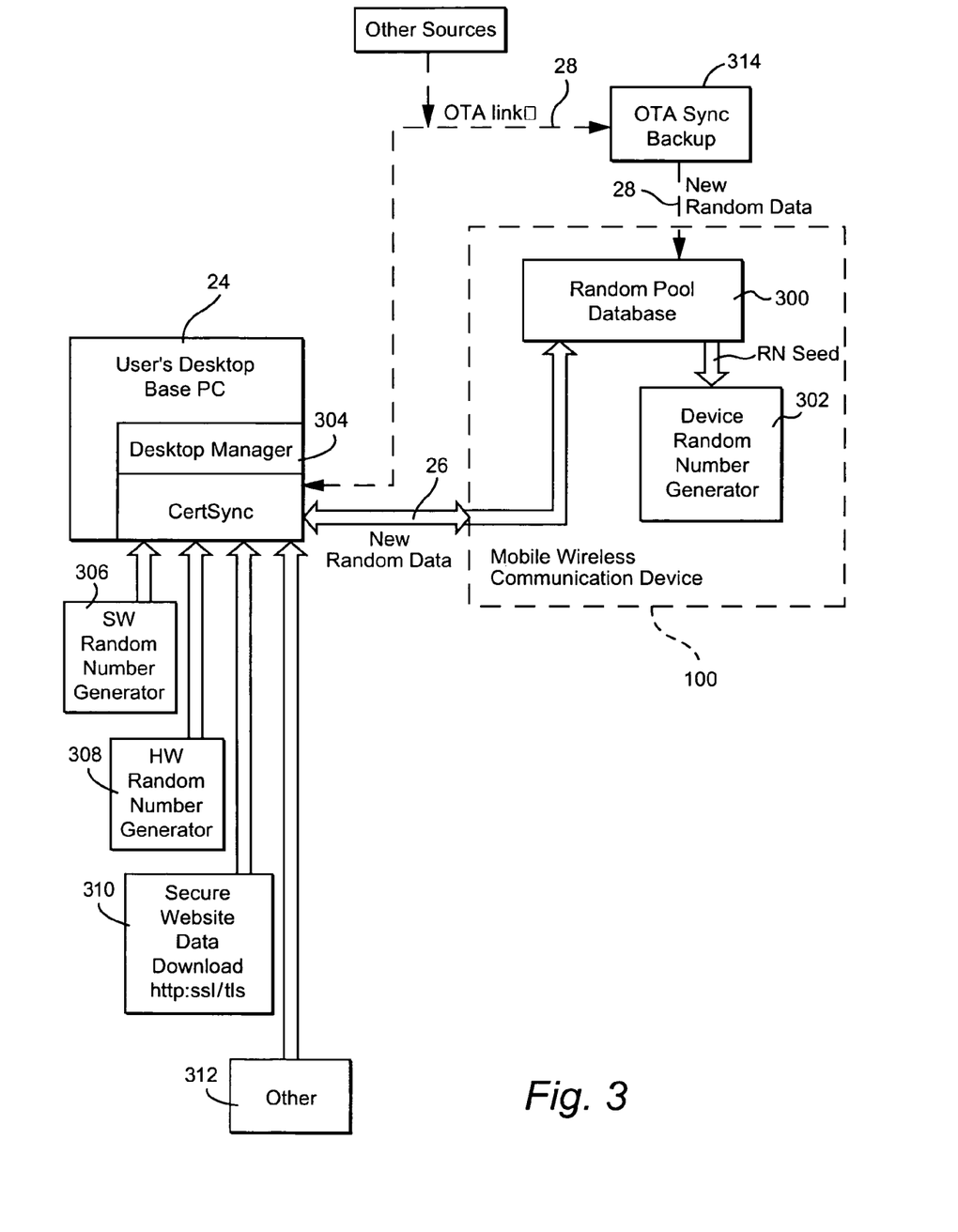
FIG. 3 is an abbreviated schematic functional diagram of the hardware/software utilized to achieve securely added randomness in the exemplary embodiment of FIG. 1.

As depicted in FIG. 3, to provide desired additional randomness at any time during the usage of device 100, a "random pool" database 300 has been created. For example, it might comprise a portion of the device data memory in which a string of randomly valued binary bits (e.g., 1024 bits) is stored. This random pool of bits may then be used (entirely or in part or in combination or permutation of parts thereof) to provide random seed data to a conventional device random number generator 302 as needed.

The user's base unit 24 (such as a desktop PC) may be of conventional hardware and operating system design. It will typically include desktop manager program logic 304 (e.g., executable computer program code) for managing, among other things, a normal (i.e., conventional) data synchronization connection to device 100. As previously mentioned, in the environment of mobile wireless communication systems, such a desktop manager may typically include logic for synchronizing cryptographic message certificates. Such logic is denoted here as Cert Sync. In the exemplary embodiment, additional functions of securely providing added randomness during data synchronization to device 100 have been added to the Cert Sync logic. However, as those skilled in the art will appreciate, the program logic to be described below for securely sending added randomness to device 100 may be associated with any desired portion of desktop manager 304 and/or may be provided as an entirely separate self-standing set of program logic (e.g., computer software) if desired.

In the exemplary embodiment, whenever a user synchronizes device 100 with the base unit 24, the Cert Sync logic is configured to also send new random data to device 100 for use in the "random pool" database 300. The device 100 can then use this updated or additionally randomized data to help seed its own random number generator 302.

Cert Sync can generate such new additional random data in multiple ways. For example, the user's base unit 24 may already have its own software random number generator 306. The user's base unit 24 may also have its own hardware random number generator 308 (or a conventional hardware random number generator might be connected to that computer). The user's base unit 24 may also have an Internet connection that provides access to a secure website 310 by downloading random data from that website over secure links (e.g., http:ssl/tls, etc.). Cert Sync logic may also have access to other sources of random data 312.

As a further refinement, device 100 in the exemplary embodiment can "backup" some of its existing randomness via a secure OTA synchronization connection 28. For example, when device 100 performs an OTA backup 314, cryptographic code may add some additional random data to the "random pool" database 300 in the backup file. If the device 100 is subsequently "wiped" (i.e., its memory cleared) for any reason, then upon OTA backup restoration, such previously stored random data (possibly even with additional new data having been added thereto) will be returned to the device 100 and thus help seed the random number generator 302 in a more acceptable and more random fashion after restoration.

Figure 4:
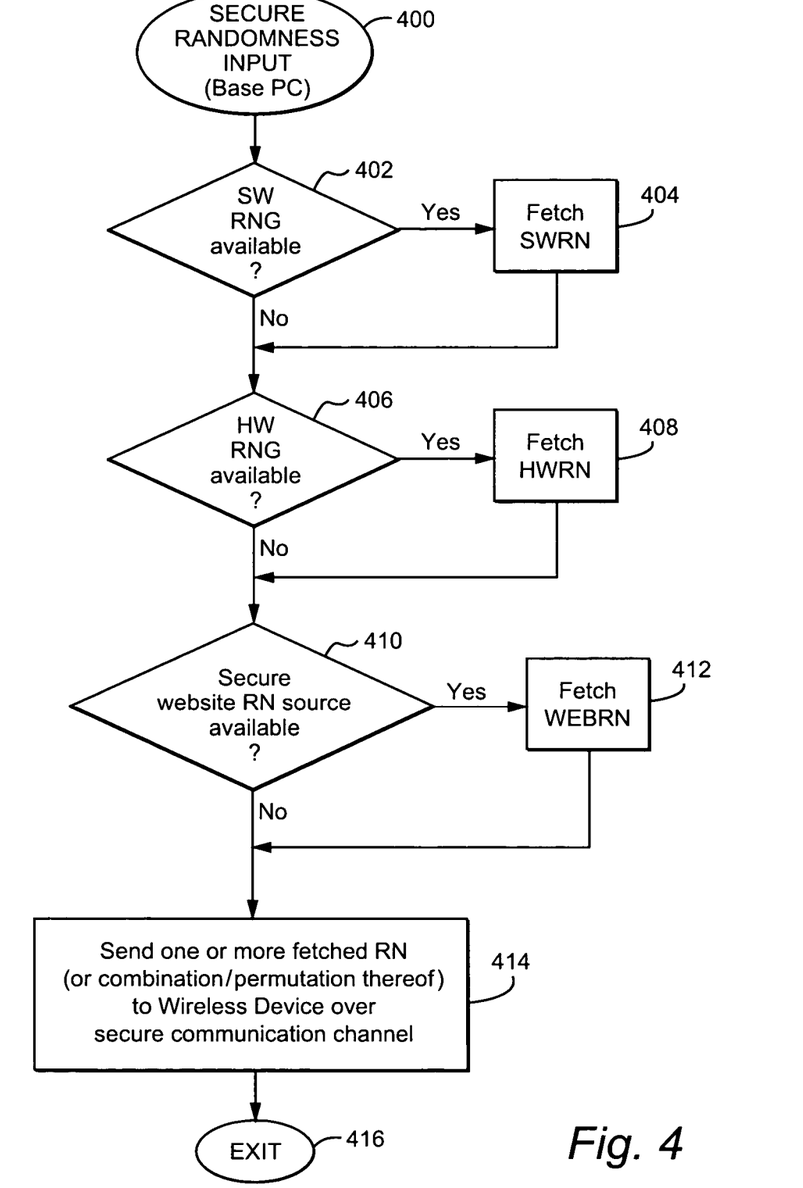
FIG. 4 is an exemplary abbreviated schematic flow diagram of computer software (i.e., program logic) that may be utilized in the user's base unit in the exemplary embodiment of FIG. 1 so as to provide additional randomness for transmission to the mobile wireless communication device.

One possible configuration of added program logic for the Cert Sync routine executed in base unit 24 is depicted at FIG. 4. Here, during a part of the Cert Sync logic (not illustrated), transfer will be made to the Secure Randomness Input sub-routine at 400 in FIG. 4. In this sub-routine, base unit 24 may check for accessibility to a software random number generator (RNG) 402. If such is available, then such software generated random number (SWRN) is fetched at 404. A similar test is made at 406 for the availability of a hardware random number generator. If that is available, then a hardware random number (HWRN) is fetched at 408. A further test may be made at 410 for accessibility to a secure website random number source. If such is available, then a web random number (WEBRN) may be fetched at 412. Of course, as those in the art will appreciate, any one or more of these possible sources may be accessed alone or in combination as may be desired. For example, in a currently preferred embodiment, the computer's accessible software random number generator 306 is normally utilized alone without recourse to other possible sources. However, in that presently preferred embodiment, a system administrator is also given the option of setting up the program logic so as to query an accessible identified secure website source of random numbers.

In any event, from whatever source or sources the new random number data is obtained, the base unit logic is configured at 414 so as to send at least one such random number RN (perhaps comprising a combination or permutation of SWRN, HWAN, WEBRN) to the wireless device over a secure communication channel (e.g., the same secure communication channel that is typically used for other data synchronization purposes) before the sub-routine of FIG. 4 is exited at 416 and control is passed back to the main Cert Sync program logic.

Figure 5:
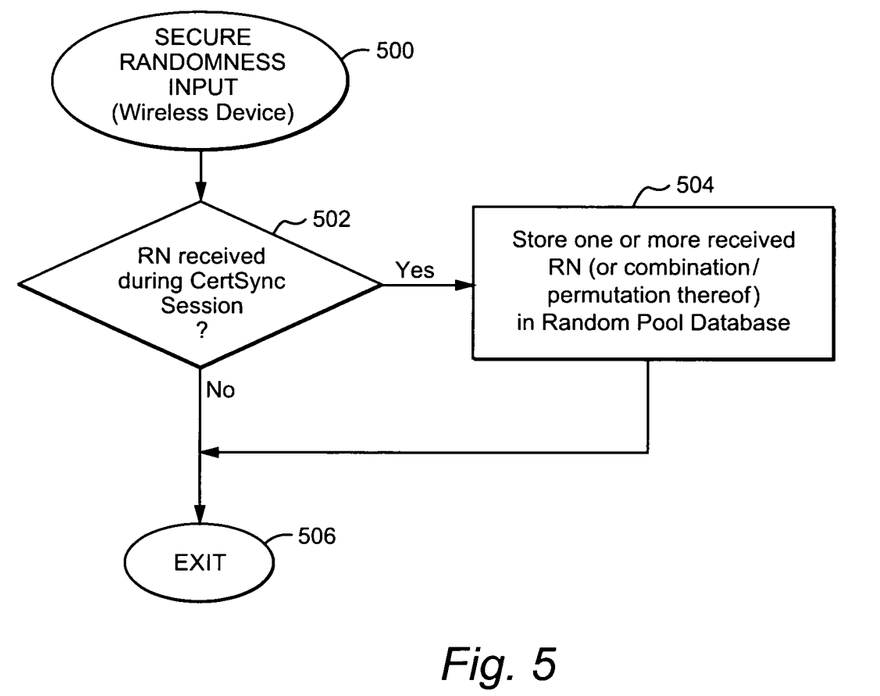
FIG. 5 is an exemplary abbreviated schematic flow diagram of computer software (i.e., program logic) that may be utilized in the mobile wireless communication device of FIG. 1 to accept securely presented added randomness and store it in a maintained random pool database to thereby enhance subsequent cryptographic functions of the device in the exemplary embodiment.

Of course, the mobile wireless communication device 100 must also include suitable program logic (in either hardware or software structure) so as to accept the incoming new random data and store it in the random pool database 300 for subsequent use. In the presently preferred exemplary embodiment, such additional program logic is included in the corresponding Cert Sync portion of the data synchronization logic. Thus a Secure Randomness Input routine at the wireless device 100 side is entered at 500 as depicted in FIG. 5. A test may be made at 502 to see if new random number data RN has been received during a Cert Sync session. If so, then such new incoming randomness is stored at 504. As previously mentioned, one or more received random data (or some combination or permutation thereof) may be stored in whole or in part in the random pool database 300 so as to increase its effective randomness. The sub-routine is then exited at 506 in FIG. 5.

In this current preferred exemplary implementation, device 100 and base unit 24 connect and synchronize data normally. However, during the synchronization process, a component of the desktop generates new random data. As previously mentioned, this can be done in multiple ways:

a. By using a software random number generator on the base unit 24 it is running on.
b. By querying a hardware random number generator connected to the base unit 24 it is running on.
c. By querying a URL, preferably over TLS/SSL for security, that has access to some source of random data.
d. Any other desired way.

The base unit 24 then transmits this new random data to the device 100 through the normal data synchronization process. The device 100 accepts such incoming random data and adds it to its own pool of random data. This pool of random data is used to help seed the devices random number generator and thus provide it with more randomness or "entropy".

While the invention has been described in connection with what is presently considered to be the most practical and preferred exemplary embodiments, it is to be understood that the invention is not to be limited to the disclosed embodiments but, on the contrary, is intended to cover all variations, medications and equivalent arrangements included within the spirit and scope of the appended claims.

The invention claimed is:

1. A wireless communication device including cryptographic functions utilizing random data input, said device comprising:
   a random data memory having a random number pool comprising random data stored therein for subsequent device operation;
   a secure data input port for receiving new random data from an external, trusted computer base, over a secure communication channel, wherein said new random data includes one or more of:
      a random number fetched from a software random number generator;
      a random number fetched from a hardware random number generator; and
      a random number fetched from a secure website random number source; and
   a control processor configured to combine or permute said new random data with the random data stored in the random number pool in said random data memory at least each time said device is connected for synchronization with the external source.

2. The wireless communication device as in claim 1 wherein said control processor is configured to combine or permute said new random data each time the device is securely received via said input port including connections with the input port made for purposes other than restoration of previously backed up data.

3. The wireless communication device as in claim 1 wherein said device further comprises:
   a random data generator configured to accept random seed data from the random number pool in said random data memory.

4. The wireless communication device as in claim 1 wherein said secure data input port comprises a wired connector suited for wired connection to a user's own trusted computer.

5. The wireless communication device as in claim 1 wherein said secure data input port comprises an encrypted wireless input communications channel.

6. The wireless communications device as in claim 1 wherein said secure data input port comprises:
   a wired connector suited for wired connection to a user's own trusted computer; and
   an encrypted wireless input communications channel.

7. A method for operating a wireless communication device including cryptographic functions utilizing random data input for providing random data needed for subsequent device operations, said method comprising:
   maintaining a random data memory having a random number pool comprising random data stored therein;
   providing a secure data input port for receiving new random data from an external, trusted base, over a secure communication channel, wherein said new random data includes one or more of:
      a random number fetched from a software random number generator;
      a random number fetched from a hardware random number generator; and
      a random number fetched from a secure website random number source; and
   combining or permuting said new random data with the random data stored in the random number pool in said random data memory at least each time said device is connected for synchronization with said trusted base.

8. The method as in claim 7 wherein said adding of new random data occurs each time the device is connected to a trusted source of new random data including connections made for purposes other than restoration of previously backed up data.

9. The method as in claim 7 wherein said method further comprises:
   accepting random seed data into a random data generator from the random number pool in said random data memory.

10. The method as in claim 7 wherein said secure data input port provision comprises establishing a wired connection to a user's own trusted computer.

11. The method as in claim 7 wherein said secure data input port comprises establishing encrypted wireless input communications channel.

12. The method as in claim 7 wherein said secure data input port comprises:
   establishing a wired connection to a user's own trusted computer; and
   establishing an encrypted wireless input communications channel.

13. A non-transitory computer-readable storage medium having stored therein a computer program for use in a wireless communication device including a processor, cryptographic functions utilizing random data input, a random data memory having a random number pool comprising random data stored therein and a secure data input port, said program, when executed, causing said processor to:
   receive new random data from an external, trusted base, over a secure communication channel, wherein said new random data includes one or more of:
      a random number fetched from a software random number generator;
      a random number fetched from a hardware random number generator; and
      a random number fetched from a secure website random number source;
   combine or permute said new random data with the random data stored in the random number pool in said random number memory at least each time said device is connected for synchronization with a trusted computer base.

14. The computer-readable storage medium as in claim 13, wherein said combining or permuting said new random data with the random data stored in said random memory data memory occurs each time the device is securely received via said secure data input port including connecting with the secure data input port mode for purposes other than restoration of previously backed up data.

15. A base system for use with a wireless communication device including cryptographic functions requiring random data input and a memory storing random data used for generating such input, said system comprising:
   a secure input/output data port; and
   a control processor configured to provide, over a secure communication channel, new random data to be added to a random number pool in a random data memory in said wireless communication device via said secure input/output data port at least each time the device is securely connected to the base system for synchronization, said new random data including a combination or permutation of one or more of:
- a random number fetched, by said control processor, from a software random number generator;
- a random number fetched, by said control processor, from a hardware random number generator; and
- a random number fetched, by said control processor, from a secure website random number source.

16. The base system as in claim 15 wherein said secure input/output data port includes a trusted wired connection.

17. The base system as in claim 15 wherein said secure input/output data port includes a cryptographically secured wireless communication link.

18. The base system as in claim 15, wherein said providing said new random data occurs each time the device is securely connected to the base system including connections made for purposes other than restoration of previously backed up data.

19. A method for operating a base system used with a wireless communication device including cryptographic functions utilizing random data input and a random data memory storing random data used for generating such input, said method comprising:
providing a secure input/output data port; and
sending, over a secure communication channel, new random data to said wireless communication device via said secure input/output data port for addition to a random number pool in said random data memory in said wireless communication device at least each time the device is securely connected to the base system for synchronization;
wherein said new random data includes a combination or permutation of one or more of:
- a random number fetched from a software random number generator;
- a random number fetched from a hardware random number generator; and
- a random number fetched from a secure website random number source.

20. The method as in claim 19 wherein said secure input/output data port includes a trusted wired connection.

21. The method as in claim 19 wherein said secure input/output data port includes a cryptographically secured wireless communication link.

22. The method as in claim 19, wherein said sending said new random data to the said wireless communication device occurs each time the device is securely connected to the base system including connections made for purposes other than restoration of previously backed up data.

23. A non-transitory computer-readable storage medium having stored therein a computer program for use in a base system used with a wireless communication device including cryptographic functions requiring random data input for subsequent device operation and a random data memory storing a random number pool comprising random data used for generating such input via a secure input/output data port over a secure communication channel, said stored program, when executed, causing:
new random data to be generated, said new random data including a combination or permutation of one or more of:
- a random number fetched from a software random number generator;
- a random number fetched from a hardware random number generator; and
- a random number fetched from a secure website random number source; and said new random data to be sent to said wireless communication device via said secure input/output data port at least each time the device is connected to the base system for synchronization.

24. The computer-readable storage medium as in claim 23, wherein said stored program, when executed, causes new random data to be sent to said wireless communication device occurs each time the device is securely connected to the base system including connections made for purposes other than restoration of previously backed up data.

25. A wireless communication system comprising:
(a) a base sub-system; and
(b) a mobile wireless communication device including cryptographic functions utilizing random data input, said wireless communication device including:
  (i) a random data memory having a random number pool comprising random data stored therein for subsequent device operation;
  (ii) a device data input port; and
  (iii) a device control processor configured to combine or permute said new random data with the random data stored in the random number pool in said random data memory, said new random data securely received over a secure communication channel from said base sub-system via said device data input port at least each time the wireless communication device is connected to said base sub-system for synchronization,
  wherein said new random data includes one or more of:
  - a random number fetched from a software random number generator;
  - a random number fetched from a hardware random number generator; and
  - a random number fetched from a secure website random number source; and
said base sub-system for use with said wireless communication device, said base sub-system including:
  (i) a base input/output data port; and
  (ii) a base control processor configured to provide said new random data to said wireless communication device via said base input/output data port at least each time the wireless communication device is connected to said base sub-system for synchronization.

26. A method for operating a wireless communication system, said method comprising:
(a) providing a mobile wireless communication device including cryptographic functions utilizing random data input, a random data memory having a random number pool comprising random data stored therein for subsequent device operation, and a device data input port;
(b) providing a base sub-system having a base input/output data port for use with said wireless communication device;
(c) combining or permuting, at said wireless communication device new random data with the random data stored in the random number pool in said random data memory, said new random data securely received, over a secure communication channel, from said base sub-system via said device data input port at least each time the device is connected to said base sub-system for synchronization, said new random data includes one or more of:
- a random number fetched from a software random number generator;
- a random number fetched from a hardware random number generator; and
- a random number fetched from a secure website random number source;

(d) sending, at said base sub-system, said new random data to said wireless communication device, over said secure communication channel, via said base input/output data port at least each time the wireless communication device is connected to said base sub-system for synchronization.

27. At least one non-transitory computer-readable storage medium having stored thereon computer programs for use in a wireless communication system including:
   (a) a mobile wireless communication device including cryptographic functions utilizing random data input, a random data memory having a random number pool comprising random data stored therein, and a device data input port; and
   (b) a base sub-system having a base input/output data port for use with said wireless communication device;
   said computer programs, when executed on said wireless communication device and said base sub-system, cause:
      (i) new random data to be generated at said base sub-system and sent, over a secure communication channel, to said wireless communication device via said base input/output data port, said new random data includes one or more of:
         a random number fetched from a software random number generator;
         a random number fetched from a hardware random number generator; and
         a random number fetched from a secure website random number source; and
      (ii) said new random data to be combined or permuted with the random data stored in said random number pool in said random data memory of the wireless communication device upon receipt from said base sub-system via said device data input port at least each time the wireless communication device is connected to said base sub-system for synchronization, said wireless communication device being configured to implement cryptographic functions requiring random data input.

* * * * *